US007155334B1

(12) United States Patent
Stewart et al.

(10) Patent No.: US 7,155,334 B1
(45) Date of Patent: Dec. 26, 2006

(54) USE OF SENSORS IN A STATE OBSERVER FOR A DIESEL ENGINE

(75) Inventors: Gregory E. Stewart, Vancouver (CA); Soumitri N. Kolavennu, Minneapolis, MN (US); Francesco Borrelli, Frattamaggiore (IT); Gregory J. Hampson, Stillwater, NY (US); Syed M. Shahed, Rancho Palos Verdes, CA (US); Tariq Samad, Minneapolis, MN (US); Michael L. Rhodes, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/238,192

(22) Filed: Sep. 29, 2005

(51) Int. Cl.
*G06F 19/00* (2006.01)
*G01M 19/00* (2006.01)

(52) U.S. Cl. ........................ 701/114; 123/434; 73/118.1

(58) Field of Classification Search ................ 701/101, 701/102, 104, 105, 114, 115; 73/118.1, 23.31, 73/23.32; 123/434, 674, 676
See application file for complete search history.

(56) References Cited

U.S. PATENT DOCUMENTS 3,744,461 A 7/1973 Davis
4,005,578 A 2/1977 McInerney
4,055,158 A 10/1977 Marsee
4,252,098 A 2/1981 Tomczak et al.
4,383,441 A 5/1983 Willis et al.
4,426,982 A 1/1984 Lehner et al.
4,438,497 A 3/1984 Willis et al.
4,456,883 A 6/1984 Bullis et al.
4,485,794 A 12/1984 Kimberley et al.
4,601,270 A 7/1986 Kimberley et al.
4,653,449 A 3/1987 Kamei et al.
5,044,337 A 9/1991 Williams
5,076,237 A 12/1991 Hartman et al.

(Continued)

FOREIGN PATENT DOCUMENTS

WO WO 02/101208 12/2002

(Continued)

OTHER PUBLICATIONS

"SCR, 400-csi Coated Catalyst," Leading NOx Control Technologies Status Summary, 1 page prior to the filing date of the present application.

(Continued)

*Primary Examiner*—John T. Kwon
(74) *Attorney, Agent, or Firm*—Kris T. Fredrick

(57) ABSTRACT

Systems and methods for controlling an engine using feedback from one or more sensors are disclosed. An illustrative control system for controlling a diesel engine may include one or more post-combustion sensors adapted to directly sense at least one constituent of exhaust gasses emitted from the exhaust manifold of the engine, and a state observer for estimating the internal state of the diesel engine based on feedback signals received from the post-combustion sensors and from subsequent use of the estimated state in a controller that sends the actuator setpoints. The post-combustion sensors can be configured to directly measure emissions such as oxides of nitrogen ($NO_x$) and/or particulate matter (PM) within the exhaust stream, and provide such information to a state observer that, in turn, updates an internal dynamical state based on these measurements. In some cases, other sensors such as a torque load sensor, an in-cylinder pressure sensor, and/or a fuel composition sensor can be further used to update the internal state of the state space model, as needed. Using an estimated state from the state observer, a state feedback controller can compute and adjust various actuator setpoints from values that more accurately represent the true state of the system.

14 Claims, 6 Drawing Sheets

U.S. PATENT DOCUMENTS 5,089,236 A 2/1992 Clerc
5,108,716 A 4/1992 Nishizawa
5,123,397 A 6/1992 Richeson
5,233,829 A 8/1993 Komatsu
5,282,449 A 2/1994 Takahashi et al.
5,349,816 A 9/1994 Sanbayashi et al.
5,365,734 A 11/1994 Takeshima
5,398,502 A 3/1995 Watanabe
5,452,576 A 9/1995 Hamburg et al.
5,477,840 A 12/1995 Neumann
5,560,208 A 10/1996 Halimi et al.
5,570,574 A 11/1996 Yamashita et al.
5,609,139 A 3/1997 Ueda et al.
5,611,198 A 3/1997 Lane et al.
5,690,086 A 11/1997 Kawano et al.
5,692,478 A 12/1997 Nogi et al.
5,746,183 A 5/1998 Parke et al.
5,765,533 A 6/1998 Nakajima
5,771,867 A 6/1998 Amstutz et al.
5,785,030 A 7/1998 Paas
5,788,004 A 8/1998 Friedmann et al.
5,846,157 A 12/1998 Reinke et al.
5,893,092 A 4/1999 Driscoll
5,942,195 A 8/1999 Lecea et al.
5,964,199 A 10/1999 Atago et al.
5,974,788 A 11/1999 Hepburn et al.
6,009,369 A * 12/1999 Boisvert et al. .............. 701/99
6,029,626 A 2/2000 Bruestle
6,035,640 A 3/2000 Kolmanovsky et al.
6,048,620 A 4/2000 Zhong
6,055,810 A 5/2000 Borland et al.
6,058,700 A 5/2000 Yamashita et al.
6,067,800 A 5/2000 Kolmanovsky et al.
6,076,353 A 6/2000 Freudenberg et al.
6,105,365 A 8/2000 Deeba et al.
6,153,159 A 11/2000 Engeler et al.
6,161,528 A 12/2000 Akao et al.
6,170,259 B1 1/2001 Boegner et al.
6,171,556 B1 1/2001 Burk et al.
6,178,743 B1 1/2001 Hirota et al.
6,178,749 B1 1/2001 Kolmanovsky et al.
6,216,083 B1 4/2001 Ulyanov et al.
6,237,330 B1 5/2001 Takahashi et al.
6,242,873 B1 6/2001 Drozdz et al.
6,263,672 B1 7/2001 Roby et al.
6,269,633 B1 * 8/2001 van Nieuwstadt et al. .... 60/277
6,273,060 B1 8/2001 Cullen
6,279,551 B1 8/2001 Iwano et al.
6,312,538 B1 11/2001 Latypov et al.
6,321,538 B1 11/2001 Hasler
6,338,245 B1 1/2002 Shimoda et al.
6,347,619 B1 2/2002 Whiting et al.
6,360,159 B1 3/2002 Miller et al.
6,360,541 B1 3/2002 Waszkiewicz et al.
6,360,732 B1 3/2002 Bailey et al.
6,379,281 B1 4/2002 Collins et al.
6,425,371 B1 7/2002 Majima
6,427,436 B1 8/2002 Allansson et al.
6,431,160 B1 8/2002 Sugiyama et al.
6,463,733 B1 10/2002 Asik et al.
6,463,734 B1 10/2002 Tamura et al.
6,470,682 B1 10/2002 Gray, Jr.
6,470,866 B1 10/2002 Cook
6,502,391 B1 1/2003 Hirota et al.
6,512,974 B1 1/2003 Houston et al.
6,546,329 B1 4/2003 Bellinger
6,560,528 B1 5/2003 Gitlin et al.
6,571,191 B1 5/2003 York et al.
6,579,206 B1 6/2003 Liu et al.
6,612,293 B1 9/2003 Schweinzer et al.
6,625,978 B1 9/2003 Eriksson et al.
6,629,408 B1 10/2003 Murakami et al.
6,647,710 B1 11/2003 Nishiyama et al.
6,647,971 B1 11/2003 Vaughan et al.
6,671,603 B1 12/2003 Cari et al.
6,672,060 B1 1/2004 Buckland et al.
6,679,050 B1 1/2004 Takahashi et al.
6,687,597 B1 2/2004 Sulatisky et al.
6,705,084 B1 3/2004 Allen et al.
6,742,330 B1 6/2004 Genderen
6,758,037 B1 7/2004 Terada et al.
6,789,533 B1 9/2004 Hashimoto et al.
6,823,667 B1 11/2004 Braun et al.
6,823,675 B1 11/2004 Brunell et al.
6,826,903 B1 12/2004 Yahata et al.
6,827,061 B1 12/2004 Nytomt et al.
7,047,728 B1 * 5/2006 Yasui .......................... 60/285
7,055,493 B1 * 6/2006 Bertilsson ................... 123/299
2001/0002591 A1 6/2001 Majima
2002/0029564 A1 3/2002 Roth et al.
2002/0056434 A1 5/2002 Flamig-Vetter et al.
2002/0098975 A1 7/2002 Kimura et al.
2002/0170550 A1 11/2002 Mitsutani
2002/0173919 A1 11/2002 Moteki et al.
2002/0184879 A1 12/2002 Lewis
2002/0194835 A1 12/2002 Bromberg et al.
2003/0022752 A1 1/2003 Liu et al.
2003/0041590 A1 3/2003 Kitajima et al.
2003/0089101 A1 5/2003 Tanaka et al.
2003/0101713 A1 6/2003 Dalla Betta et al.
2003/0120410 A1 6/2003 Cari et al.
2003/0143957 A1 7/2003 Lyon
2003/0145837 A1 8/2003 Esteghlal et al.
2003/0150422 A1 8/2003 Huh
2003/0172907 A1 9/2003 Nytomt et al.
2003/0200016 A1 10/2003 Spillane et al.
2003/0221679 A1 12/2003 Surnilla
2003/0225507 A1 12/2003 Tamura
2004/0006973 A1 1/2004 Makki et al.
2004/0007211 A1 1/2004 Kobayashi
2004/0007217 A1 1/2004 Poola et al.
2004/0025837 A1 2/2004 Hunt et al.
2004/0030485 A1 * 2/2004 Yasui ......................... 701/109
2004/0040283 A1 3/2004 Yasui et al.
2004/0040287 A1 3/2004 Beutel et al.
2004/0050037 A1 3/2004 Betta et al.
2004/0055278 A1 3/2004 Miyoshi et al.
2004/0060284 A1 4/2004 Roberts, Jr. et al.
2004/0074226 A1 4/2004 Tanaka
2004/0089279 A1 5/2004 McLaughlin et al.
2004/0118117 A1 6/2004 Hartman et al.
2004/0128058 A1 7/2004 Andres et al.
2004/0129259 A1 7/2004 Mitsutani
2004/0134464 A1 7/2004 Mogi
2004/0135584 A1 7/2004 Nagy et al.
2004/0139735 A1 7/2004 Zhu
2004/0139951 A1 7/2004 Fisher et al.
2004/0249558 A1 12/2004 Meaney
2005/0072401 A1 * 4/2005 Bertilsson ................... 123/299
2005/0252497 A1 * 11/2005 Yasui et al. ................. 123/697
2005/0263397 A1 * 12/2005 Yasui et al. ................. 204/425
2006/0137329 A1 * 6/2006 Lowe et al. .................. 60/286

FOREIGN PATENT DOCUMENTS

WO WO 2004/027230 4/2004

OTHER PUBLICATIONS

Advanced Petroleum-Based Fuels-Diesel Emissions Control (APBF-DEC) Project, "Quarterly Update," No. 7, 6 pages, Fall 2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.
Amstuz, et al., "EGO Sensor Based Robust Output Control of EGR in Diesel Engines," IEEE TCST, vol. 3, No. 1, 12 pages, Mar. 1995.
Bemporad, et al., "Explicit Model Predictive Control," 1 page, prior to filing date of present application.
Borrelli, "Constrained Optimal Control of Linear and Hybrid Systems," Lecture Notes in Control and Information Sciences, vol. 290, 2003.
Catalytica Energy Systems, "Innovative NOx Reduction Solutions for Diesel Engines," 13 pages, 3rd Quarter, 2003.
Chatterjee, et al. "Catalytic Emission Control for Heavy Duty Diesel Engines," JM, 46 pages, prior to filing date of present application.
Collins et al., "Real-Time Smoke Sensor for Diesel Engines," SAE, No. 860157, 7 pages, 1986.
Delphi, Delphi Diesel NOx Trap (DNT), 3 pages, Feb. 2004.
GM "Advanced Diesel Technology and Emissions," powertrain technologies—engines, 2 pages, prior to filing date of present application.
Guzzella, et al., "Control of Diesel Engines," IEEE Control Systems Magazine, pp. 53-71, Oct. 1998.
Havelena, "Componentized Architecture for Advanced Process Management," Honeywell International, 42 pages, 2004.
Hiranuma, et al., "Development of DPF System for Commercial Vehicle—Basic Characteristic and Active Regeneration Performance," SAE Paper No. 2003-01-3182, Mar. 2003.
Honeywell, "Profit Optimizer A Distributed Quadratic Program (DQP) Concepts Reference," 48 pages, prior to filing date of present application.
http://www.not2fast.wryday.com/turbo/glossary/turbo_glossary.shtml, "Not2Fast: Turbo Glossary," 22 pages, printed Oct. 1, 2004.
http://www.tai-cwv.com/sb1106.0html, "Technical Overview-Advanced Control Solutions," 6 pages, printed Sep. 9, 2004.
Kelly, et al., "Reducing Soot Emissions from Diesel Engines Using One Atmosphere Uniform Glow Discharge Plasma," SAE Paper No. 2003-01-1183, Mar. 2003.
Kolmanovsky, et al., "Issues in Modeling and Control of Intake Flow in Variable Geometry Turbocharged Engines", 18th IFIP Conf. System Modeling and Optimization, pp. 436-445, Jul. 1997.
Kulhavy, et al. "Emerging Technologies for Enterprise Optimization in the Process Industries," Honeywell, 12 pages, Dec. 2000.
Locker, et al., "Diesel Particulate Filter Operational Characterization," Corning Incorporated, 10 pages, prior to filing date of present application.
Lu "Challenging Control Problems and Engineering Technologies in Enterprise Optimization," Honeywell Hi-Spec Solutions, 30 pages, Jun. 4-6, 2001.
Moore, "Living with Cooled-EGR Engines," Prevention Illustrated, 3 pages, Oct. 3, 2004.
National Renewable Energy Laboratory (NREL), "Diesel Emissions Control- Sulfur Effects Project (DECSE) Summary of Reports," U.S. Department of Energy, 19 pages, Feb. 2002.
Salvat, et al., "Passenger Car Serial Application of a Particulate Filter System on a Common Rail Direct Injection Engine," SAE Paper No. 2000-01-0473, 14 pages, Feb. 2000.
Shamma, et al. "Approximate Set-Valued Observers for Nonlinear Systems," IEEE Transactions on Automatic Control, vol. 42, No. 5, May 1997.
Soltis, "Current Status of NOx Sensor Development," Workshop on Sensor Needs and Requirements for PEM Fuel Cell Systems and Direct-Injection Engines, 9 pages, Jan. 25-26, 2000.
Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.
Storset, et al., "Air Charge Estimation for Turbocharged Diesel Engines," vol. 1 Proceedings of the American Control Conference, 8 pages, Jun. 28-30, 2000.
The MathWorks, "Model-Based Calibration Toolbox 2.1 Calibrate complex powertrain systems," 4 pages, printed prior to filing date of present application.
The MathWorks, "Model-Based Calibration Toolbox 2.1.2," 2 pages, prior to filing date of present application.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.
Zenlenka, et al., "An Active Regeneration as a Key Element for Safe Particulate Trap Use," SAE Paper No. 2001-0103199, 13 pages, Feb. 2001.

* cited by examiner

USE OF SENSORS IN A STATE OBSERVER FOR A DIESEL ENGINE

FIELD

The present invention relates generally to emissions sensing for engines. More specifically, the present invention pertains to the use of sensors in the feedback control of diesel engines.

BACKGROUND

Engine sensors are used in many conventional engines to indirectly detect the presence of emissions such as oxides of nitrogen ($NO_x$) and/or particulate matter (PM) in the exhaust stream. In diesel engines, for example, such sensors are sometimes used to measure manifold air temperature (MAT), manifold air pressure (MAP), and manifold air flow (MAF) of air injected into the engine intake manifold ahead of the engine combustion and aftertreatment devices. These sensed parameters are then analyzed in conjunction with other engine properties to adjust the performance characteristics of the engine.

In some designs, the vehicle may be equipped with an electronic control unit (ECU) capable of sending commands to actuators in order to control the engine, aftertreatment devices, as well as other powertrain components in order to achieve a desired balance between engine power and emissions. To obtain an estimate of the emissions outputted by the engine, an engine map modeling the engine combustion may be constructed during calibration to infer the amount of $NO_x$ and PM produced and emitted from the engine. Depending on the particular time during the drive cycle, the ECU may adjust various actuators to control the engine in a desired manner to compensate for both engine performance and emissions constants. Typically, there is a trade off between engine performance and the amount of acceptable $NO_x$ and/or PM that can be emitted from the engine. At certain times during the drive cycle such as during cruising speeds, for example, it may be possible to control the engine in order to reduce the amount of $NO_x$ and/or PM emitted without significantly sacrificing engine performance. Conversely, at other times during the drive cycle such as during hard acceleration, it may be necessary to sacrifice emissions performance in order to increase engine power. At other times, an aftertreatment device may be actively regenerated, and requires different conditions achievable in part by changing the signals to the actuators.

The efficacy of the engine model and/or aftertreatment device is often dependent on the accuracy in which the model assumptions match the actual vehicle operating conditions. Conditions such as engine wear, fuel composition, and ambient air composition, for example, may change quickly as a result of changing ambient conditions or slowly over the life of the vehicle, in either case affecting the ability of the engine model to accurately predict actual vehicle operating conditions. Other factors such as changes in fuel type may also have an impact on the model assumptions used to estimate actual operating conditions. As a result, the engine model can become outdated and ineffective.

SUMMARY

The present invention relates to the use of sensors in the feedback control of engines, including diesel and gasoline engines. An illustrative control system for controlling a diesel engine in accordance with an exemplary embodiment of the present invention may include one or more post-combustion sensors adapted to directly sense at least one constituent of exhaust gasses emitted from the exhaust manifold of the engine, and a state observer for estimating the state of a dynamic model based on feedback signals received from the post-combustion sensors. The post-combustion sensors can comprise any number of sensors adapted to measure constituents within the exhaust stream. In certain embodiments, for example, the post-combustion sensors may include a $NO_x$ sensor for measuring oxides of nitrogen within the exhaust stream and/or a PM sensor for measuring particulate matter or soot within the exhaust stream. In some embodiments, other sensors such as a torque load sensor, an in-cylinder pressure sensor, and/or a fluid composition sensor may also be provided to directly sense other engine-related parameters that can also be used by the state observer to estimate the dynamical state of a model. This state could then be used in a control strategy to control engine performance and emissions discharge. In some embodiments, the control strategy could be used to control other aspects of the engine such as aftertreatment.

The state observer algorithm can be implemented in software embedded in a controller (e.g. an electronic control unit). This algorithm may include a state space model representation of the engine system, including both the air and fuel sides of the engine. In some embodiments, for example, the state space model may include an engine model that receives various signals representing sensor and actuator positions. In some cases, a torque sensor may be used in conjunction with engine speed to augment a model of the rotational inertia. Using the signals provided by the various post-combustion sensors as well as from other sensors (e.g. torque load sensor, in-cylinder pressure sensor, fuel composition sensor, etc.), a state observer can be configured to monitor and, if necessary, adjust the internal state of the state space model, allowing the model to compensate for conditions such as engine wear, fuel composition, ambient air quality, etc. that can affect engine performance and/or emissions over the life of the vehicle.

An illustrative method of controlling a diesel engine system in accordance with an exemplary embodiment of the present invention may include the steps of directly measuring at least one constituent in the exhaust stream of the engine using one or more post-combustion sensors, providing a state observer that contains a state space model of the diesel engine system used to determine the internal state of the state space model based in part on signals received from the one or more post-combustion sensors and/or one or more other sensors, updating the estimated state in the event the true state of the model differs from an estimated state thereof, computing and predicting one or more engine and/or aftertreatment parameters using the updated values from the state space model, and using the estimated state in a control algorithm to adjust one or more actuator input signals based on the computed and predicted engine and/or aftertreatment parameters.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of operational steps and parameters are illustrated in the various views, those skilled in the art will recognize that many of the examples provided have suitable alternatives that can be utilized.

Figure 1:
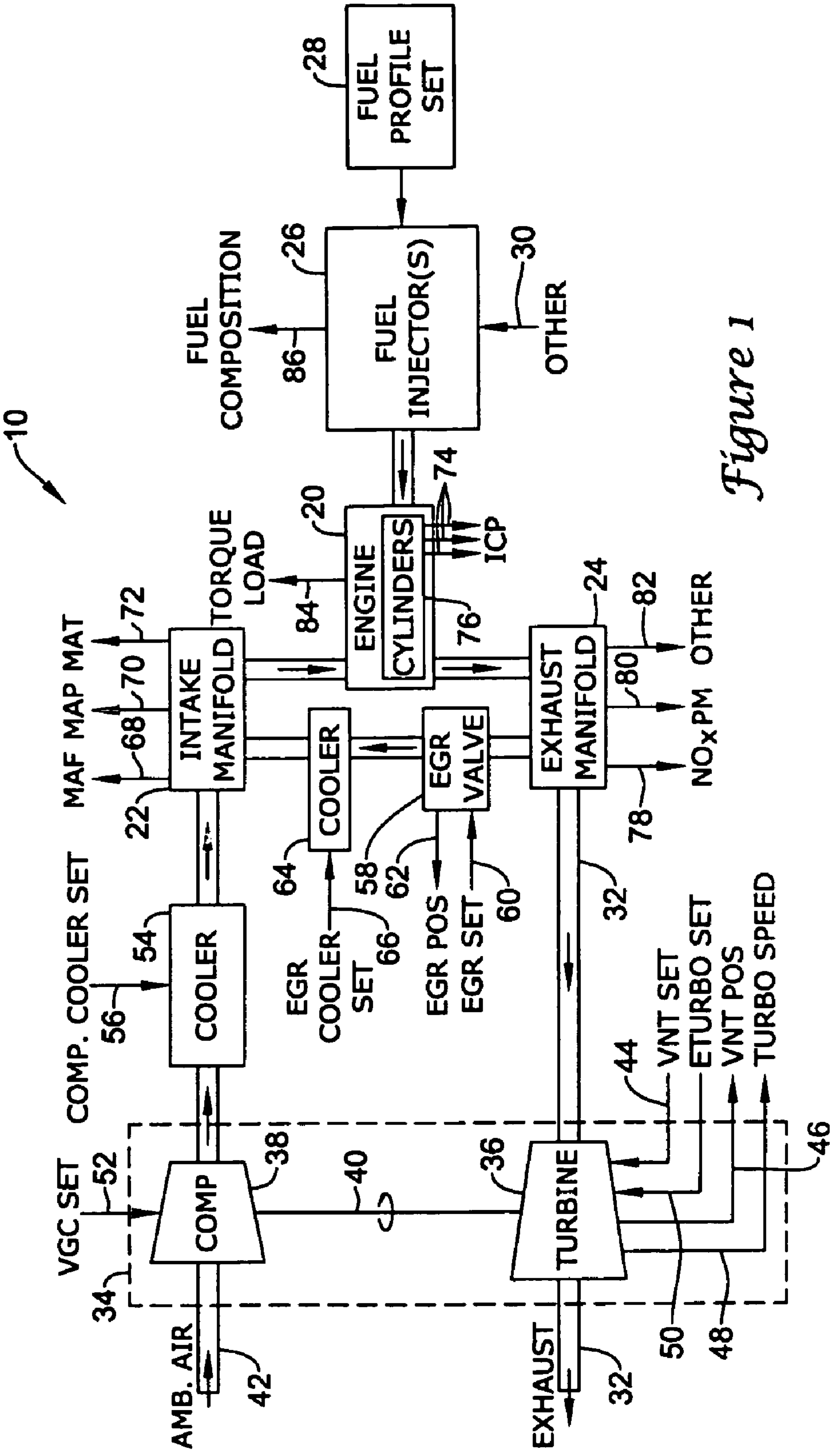
FIG. 1 is a schematic view of an illustrative diesel engine system in accordance with an exemplary embodiment of the present invention.

FIG. 1 is a schematic view of an illustrative diesel engine system in accordance with an exemplary embodiment of the present invention. The illustrative diesel engine system is generally shown at 10, and includes a diesel engine 20 having an intake manifold 22 and an exhaust manifold 24. In the illustrative embodiment, a fuel injector 26 provides fuel to the engine 20. The fuel injector 26 may include a single fuel injector, but more commonly may include a number of fuel injectors that are independently controllable. The fuel injector 26 can be configured to provide a desired fuel profile to the engine 20 based on a fuel profile setpoint 28 as well as one or more other signals 30 relating to the fuel and/or air-side control of the engine 20. The term fuel "profile", as used herein, may include any number of fuel parameters or characteristics including, for example, fuel delivery rate, change in fuel delivery rate, fuel timing, fuel pre-injection event(s), fuel post-injection event(s), fuel pulses, and/or any other fuel delivery characteristic, as desired. One or more fuel side actuators may be used to control these and other fuel parameters, as desired.

As can be further seen in FIG. 1, exhaust from the engine 20 is provided to the exhaust manifold 24, which delivers the exhaust gas down an exhaust pipe 32. In the illustrative embodiment, a turbocharger 34 is further provided downstream of the exhaust manifold 24. The illustrative turbocharger 34 may include a turbine 36, which is driven by the exhaust gas flow. In the illustrative embodiment, the rotating turbine 36 drives a compressor 38 via a mechanical coupling 40. The compressor 40 receives ambient air through passageway 42, compresses the ambient air, and then provides compressed air to the intake manifold 22, as shown.

The turbocharger 34 may be a variable nozzle turbine (VNT) turbocharger. However, it is contemplated that any suitable turbocharger may be used, including, for example, a waste gated turbocharger or a variable geometry inlet nozzle turbocharger (VGT) with an actuator to operate the waste gate or VGT vane set. The illustrative VNT turbocharger uses adjustable vanes inside an exhaust scroll to change the angle of attack of the incoming exhaust gasses as they strike the exhaust turbine 36. In the illustrative embodiment, the angle of attack of the vanes, and thus the amount of boost pressure (MAP) provided by the compressor 38, may be controlled by a VNT SET signal 44. In some cases, a VNT POS signal 46 can be provided to indicate the current vane position. A TURBO SPEED signal 48 may also be provided to indicate the current turbine speed, which in some cases can be utilized to limit the turbo speed to help prevent damage to the turbocharger 34.

To reduce turbo lag, the turbine 36 may include an electrical motor assist. Although not required in all embodiments, the electric motor assist may help increase the speed of the turbine 36 and thus the boost pressure provided by the compressor 38 to the intake manifold 22. This may be particularly useful when the engine 20 is at low engine speeds and when higher boost pressure is desired, such as under high acceleration conditions. Under these conditions, the exhaust gas flow may be insufficient to drive the turbocharger 34 to generate the desired boost pressure (MAP) at the intake manifold 22. In some embodiments, an ETURBO SET signal 50 may be provided to control the amount of electric motor assist that is provided.

The compressor 38 may comprise either a variable geometry or non-variable geometry compressor. In certain cases, for example, the compressed air that is provided by the compressor 38 may be only a function of the speed at which the turbine 36 rotates the compressor 38. In other cases, the compressor 38 may be a variable geometry compressor (VGC), wherein a VGC SET signal 52 can be used to set the vane position at the outlet of the compressor 38 to provide a controlled amount of compressed air to the intake manifold 22, as desired.

A charge air cooler 54 may be provided to help cool the compressed air before it is provided to the intake manifold 22. In some embodiments, one or more compressed air CHARGE COOLER SET signals 56 may be provided to the charge air cooler 54 to help control the temperature of the compressed air that is ultimately provided to the intake manifold 22.

In certain embodiments, and to reduce the emissions of some diesel engines such as $NO_x$, an Exhaust Gas Recirculation (EGR) valve 58 may be inserted between the exhaust manifold 24 and the intake manifold 22, as shown. In the illustrative embodiment, the EGR valve 58 accepts an EGR SET signal 60, which can be used to set the desired amount of exhaust gas recirculation (EGR) by directly changing the position setpoint of the EGR valve 58. An EGR POS signal 62 indicating the current position of the EGR valve 58 may also be provided, if desired.

In some cases, an EGR cooler 64 may be provided either upstream or downstream of the EGR valve 58 to help cool the exhaust gas before it is provided to the intake manifold 22. In some embodiments, one or more EGR COOLER SET signals 66 may be provided to the EGR cooler 64 to help control the temperature of the recirculated exhaust gas by allowing some or all of the recirculated exhaust to bypass the cooler 64.

The engine system 10 may include a number of pre-combustion sensors that can be used for monitoring the operation of the engine 20 prior to combustion. In the illustrative embodiment of FIG. 1, for example, a manifold air flow (MAF) sensor 68 may provide a measure of the intake manifold air flow (MAF) into the intake manifold 22. A manifold air pressure (MAP) sensor 70, in turn, may provide a measure of the intake manifold air pressure (MAP) at the intake manifold. A manifold air temperature (MAT) sensor 72 may provide a measure of the intake manifold air temperature (MAT) into the intake manifold. If desired, one or more other sensors may be provided to measure other pre-combustion parameters or characteristics of the diesel engine system 10.

The engine system 10 may further include a number of post-combustion sensors that can be used for monitoring the operation of the engine 20 subsequent to combustion. In some embodiments, for example, a number of in-cylinder pressure (ICP) sensors 74 can be used to sense the internal pressure within the engine cylinders 76 during the actuation cycle. A $NO_x$ sensor 78 operatively coupled to the exhaust manifold 24 may provide a measure of the $NO_x$ concentration in the exhaust gas discharged from the engine 20. In similar fashion, a Particular Matter (PM) sensor 80 operatively coupled to the exhaust manifold 24 may provide a measure of the particulate matter or soot concentration in the exhaust gas. One or more other post-combustion sensors 82 can be used to sense other parameters and/or characteristics of the exhaust gas downstream of the engine 20, if desired. Other types of emissions sensors may include carbon monoxide (CO) sensors, carbon dioxide ($CO_2$) sensors, and hydrocarbon (HC) sensors, for example. In certain embodiments, a torque load sensor 84 may be provided to measure the torque load on the engine 20, which can be used in conjunction with or in lieu of the post-combustion sensors 78,80,82 to adjust engine performance and emissions constants during the actuation cycle.

A number of fuel composition sensors 86 may be provided in some embodiments to measure one or more constituents of the fuel delivered to the engine 20. The fuel composition sensors 86 may include, for example, a flexible fuel composition sensor for the detection of biodiesel composition in biodiesel/diesel fuel blends. Other sensors for use in detecting and measuring other constituents such as the presence of water or kerosene in the fuel may also be used, if desired. During operation, the fuel composition sensors 86 can be used to adjust the fuel injection timing and/or other injection parameters to alter engine performance and/or emissions output.

Figure 2:
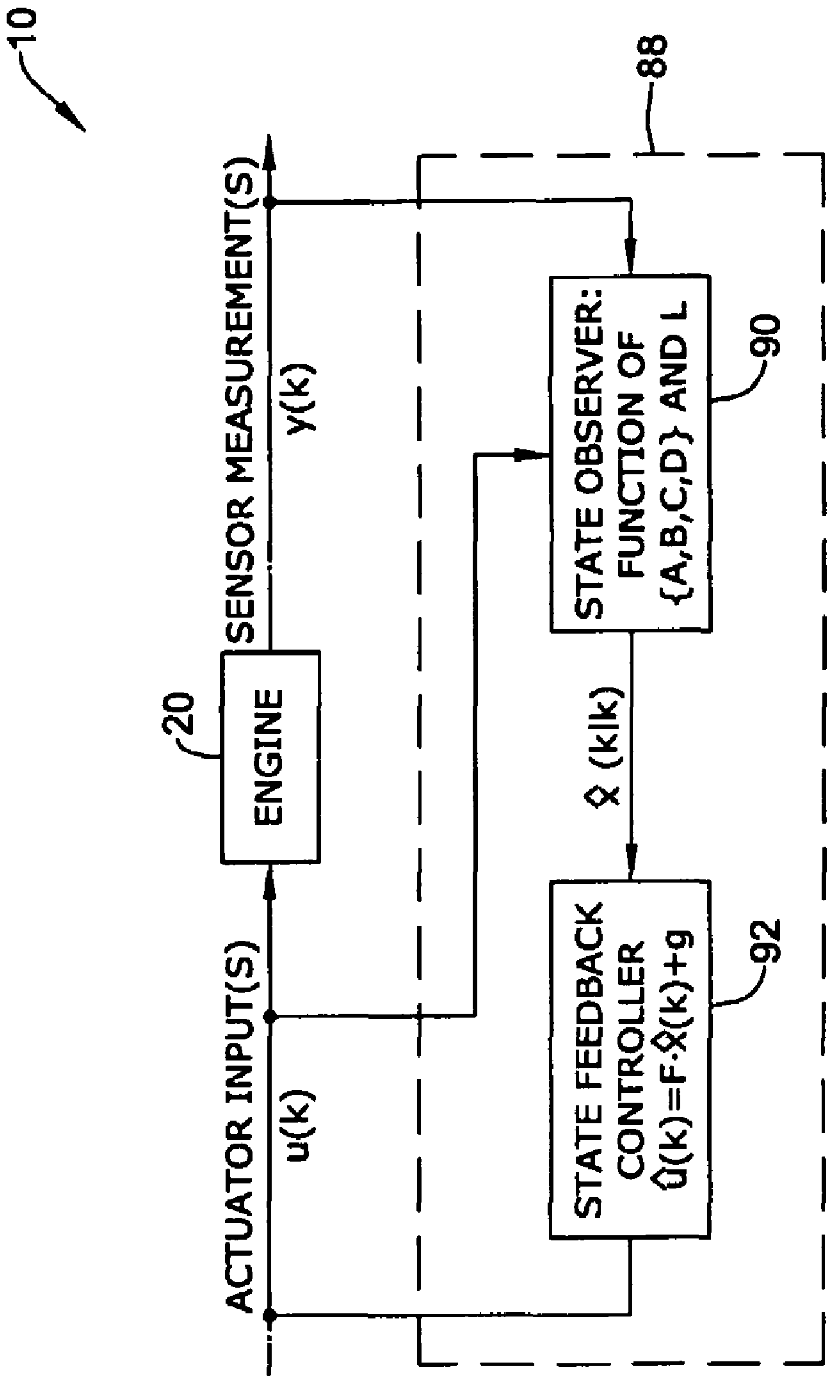
FIG. 2 is a schematic view of an illustrative controller employing a state observer for providing an estimated state for a state feedback controller for controlling the illustrative diesel engine system of FIG. 1.

Referring now to FIG. 2, a schematic view showing an illustrative electronic control unit (ECU) 88 employing a state observer for providing an estimated state for a state-feedback controller for controlling the illustrative diesel engine 20 of FIG. 1 will now be described. As shown from a control perspective in FIG. 2, the ECU 88 may include a state observer 90 including a model representation of the diesel engine system 10. The ECU 88 may comprise, for example, a Model Predictive Controller (MPC) or other suitable controller capable of providing control signals to the engine 20 subject to constraints in actuator variables, internal state variables, and measured output variables.

The state observer 90 can be configured to receive a number of sensor signals y(k) representing various sensor measurements taken from the engine 20 at time "k". Illustrative sensor signals y(k) may include, for example, the MAF signal 68, the MAP signal 70, the MAT signal 72, the TURBO SPEED signal 48, the TORQUE LOAD signal 84, and/or the FUEL COMPOSITION signal 86, as shown and described above with respect to FIG. 1. The sensor model inputs y(k) may also represent one or more of the post-combustion sensor signals including the ICP signal 74, the $NO_x$ signal 78 and/or the PM signal 80.

As further shown in FIG. 2, the state observer 90 can also be configured to receive a number of actuator signals u(k) representing various actuator inputs to the engine 20 at each discrete time "k". The actuator signals u(k) may represent the various actuator move and position signals such as the VNT POS signal 46, the ETURBO SET signal 50, the COMP. COOLER SET signal 56, the EGR POS. signal 62, and the EGR COOLER SET signal 66.

It is contemplated that the various sensor and actuator model inputs y(k), u(k) may be interrogated constantly, intermittently, or periodically, or at any other time, as desired. Also, these model inputs y(k), u(k) are only illustrative, and it is contemplated that more or less input signals may be provided, depending on the application. In some cases, the state observer 90 can also be configured to receive one or more past values y(k−N), u(k−N), for each of the number of sensor and actuator model inputs, depending on the application.

The state observer 90 can be configured to compute an estimated state $\hat{x}(k|k)$, which can then be provided to a separate state feedback controller 92 of the ECU 88 that computes the actuator inputs u(k) as a function of the internal state x(k) of the model. Examples of control feedback strategies that can be enabled by feeding back the internal state x(k) using the state feedback controller 92 may include, but are not limited to, H-infinity, H2, LQG, and MPC. In some embodiments, the state feedback controller 92 can be configured to compute new actuator inputs u(k) based on the generalized equation u(k)=F(x). A very common realization of this function is the affine form:

$$u(k)=F\cdot x(k)+g \tag{1}$$

where:

u(k) represents the input variables to the model;

x(k) represents the internal state of the model;

F is a state feedback controller matrix; and g is a constant.

An extension to the basic state feedback controller above is the following switched state feedback controller:

$$u(k)=F_i\cdot x(k)+g_i \tag{2}$$

where:

u(k) represents the input variables to the model;

x(k) represents the internal state of the model;

$F_i$ is the $i^{th}$ state feedback controller matrix;

$g_i$ is the $i^{th}$ constant; and i is an index that designates which of m distinct state feedback controllers is executed at time k.

A switched feedback controller of the form designated above in Equation (2) can be used in the multiparametric control technology for the real time implementation of constrained optimal model predictive control, as discussed, for example, in U.S. patent application Ser. No. 11/024,531, entitled "Multivariable Control For An Engine"; U.S. patent application Ser. No. 11/025,221, entitled "Pedal Position And/Or Pedal Change Rate For Use In Control Of An Engine"; U.S. patent application Ser. No. 11/025,563, entitled "Method And System For Using A Measure Of Fueling Rate In The Air Side Control Of An Engine", and U.S. patent application Ser. No. 11/094,350, entitled "Coordinated Multivariable Control Of Fuel And Air In Engines"; all of which are incorporated herein by reference. Hybrid multi-parametric algorithms are further described by F. Borrelli in "Constrained Optimal Control of Linear and Hybrid Systems", volume 290 of Lecture Notes in Control and Information Sciences, Springer, 2003, which is also incorporated herein by reference.

Using the estimated state $\hat{x}(k|k)$ from the state observer 90, the state feedback controller 92 then computes new actuator moves u(k) which are then presented to actuators or the like of the engine 20. The actuator moves u(k) outputted by the ECU 88 may be updated constantly, intermittently, or periodically, or at any other time, as desired. The engine 20 then operates using the new actuator inputs u(k) from the ECU 88, which can again be sensed and fed back to the state observer 90 and state feedback controller 92 for further correction, if necessary.

In certain embodiments, the model used by the state observer 90 can be expressed in terms of its "state space" representation based on the following generalized formulas:

$$x(k+1)=f(u,x); \text{ and} \quad (3)$$

$$y(k)=h(u,x) \quad (4)$$

where:

u(k) represents the input variables to the state space model;

y(k) represents the output variables of the state space model; and x(k) is a state vector containing information required by the state space model to produce its output y(k) at time "k".

In some embodiments, the above state space model representation may be a linear, time invariant (LTI) system, in which case the state space model in equations (3) and (4) above may be represented in terms of constant matrices:

$$x(k+1)=A\cdot x(k)+B\cdot u(k); \text{ and} \quad (5)$$

$$y(k)=C\cdot x(k)+D\cdot u(k). \quad (6)$$

where A, B, C, and D are constant matrices used by the state observer 90.

In many cases, the internal state of the state space model may not be available since the internal state "x" is unknown. In such cases, an estimated state vector $\hat{x}(k)$ of the state space model must be computed and used instead of the true internal state variables x(k). To accomplish this, and as can be understood by reference to the following generalized equations, the state observer 90 may utilize a distinct model prediction component (see steps (7), (8) below) and a distinct measurement correction (see step (9) below) in its calculations:

$$\hat{x}_{pred}(k|k)=A\cdot\hat{x}_{corr}(k-1|k-1)+B\cdot u(k-1); \quad (7)$$

$$\hat{y}_{pred}(k|k)=C\cdot\hat{x}_{pred}(k|k)+D\cdot u(k); \text{ and} \quad (8)$$

$$\hat{x}(k|k)=\hat{x}_{pred}(k|k)+L\lfloor y(k)-\hat{y}_{pred}(k|k)\rfloor. \quad (9)$$

where:

$\hat{x}_{pred}(k|k)$ is the predicted state vector for the state space model at time "k";

$\hat{y}_{pred}(k|k)$ is the predicted input variable for the state space model;

$\hat{x}(k|k)$ is the state vector for the state space model at time "k" corrected by a sensor measurement y(k) at time "k";

L is an observer gain matrix; and

A,B,C,D are constant matrices used in the model component of the state observer in modeling the diesel engine system.

In the above equations (7), (8), and (9), the variable $\hat{x}_{pred}(k|k)$ includes the predicted state vector of the state model at time "k", and $\hat{y}_{pred}(k|k)$ includes the predicted input variables from the system at time "k". The variable $\hat{x}(k|k)$, in turn, represents the state vector for the state space model at time "k" corrected by a sensor measurement y(k) at time "k" that compensates for errors in the state space model as given by comparing the sensor signal y(k) to the predicted output $\hat{y}_{pred}(k|k)$ and multiplying the error $y(k)-\hat{y}_{pred}(k|k)$ by the observer gain matrix "L" as shown in correction equation 9.

The sensor signal y(k) may include, for example, a vector obtained by multiplexing one or more of the sensor signals (e.g. MAF 68, MAP 70, MAT 72, $NO_x$ 78, PM 80, TORQUE LOAD 84, FUEL COMPOSITION 86, etc.) described above. The sensor signal y(k) may also contain other measured variables corresponding to other parameters or characteristics of the diesel engine system 10.

During operation, the state observer 90 may alternate between prediction and correction in order to generate an estimated state $\hat{x}(k)$ of the state space model that approximates the true state of the model. For linear systems, techniques such as pole placement, Kalman filtering, and/or Luenberger observer design techniques may be employed to determine the values for the observer gain matrix L such that the observer dynamics are stable and sufficiently perform the intended application. For non-linear systems, other techniques may be required. The particular technique employed in designating and computing the correction matrix values will typically depend on the number and type of sensor and actuator inputs considered, the number and type of engine components modeled, performance requirements (e.g. speed and accuracy) as well as other considerations.

In use, the ability of the state observer 90 to reconcile and reset the internal state $\hat{x}(k|k)$ of the state space model using information from one or more directly sensed engine parameters helps to ensure that the model prediction will not deteriorate over time, thus leading to poor engine performance and potential for increased emissions. For example, by directly sensing post-combustion parameters such as $NO_x$ and PM in the exhaust stream and then feeding such values to the state space model, the state observer 90 may be better able to compensate for the effects of any changes in fuel composition and/or engine wear over the life of the vehicle.

Figure 3:
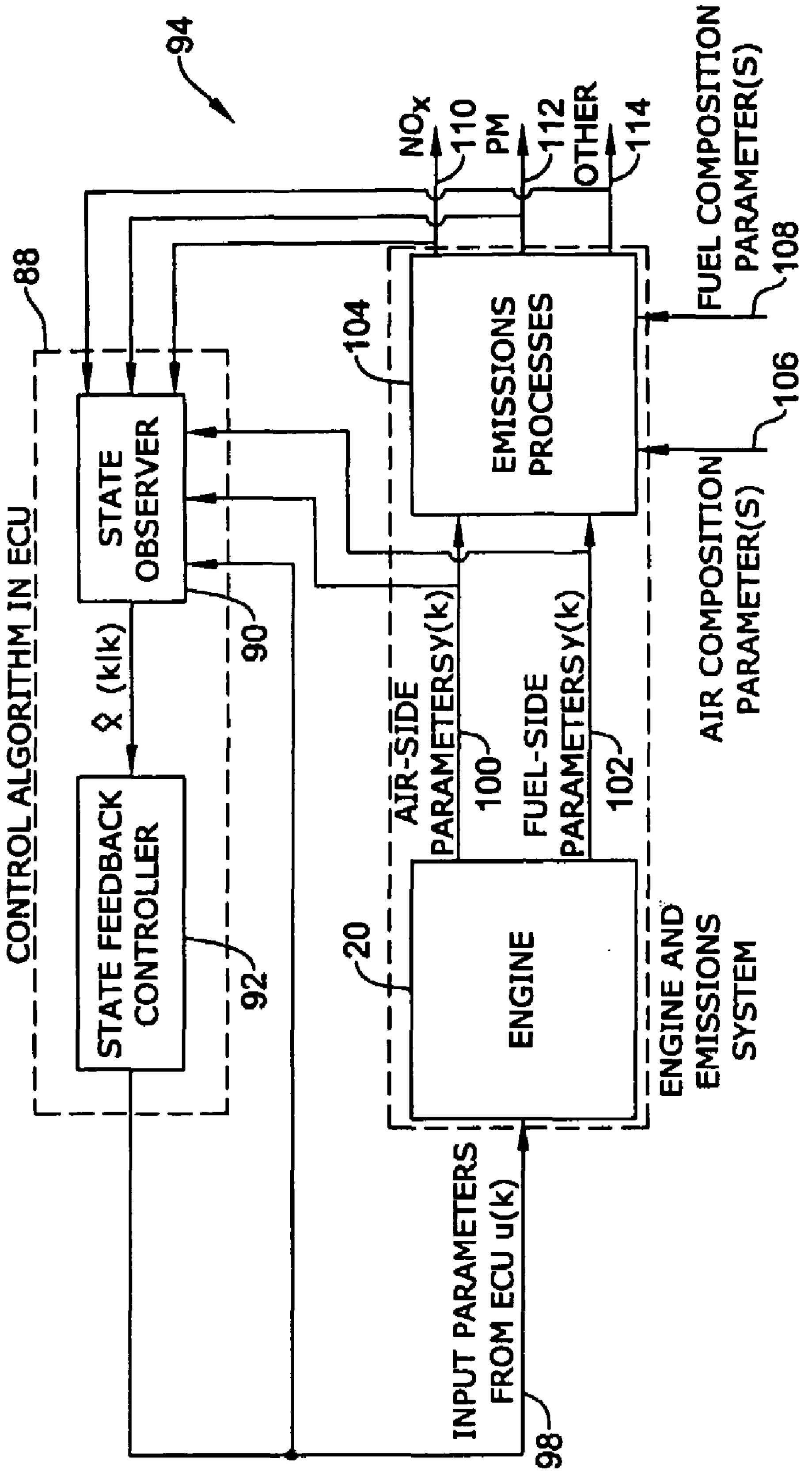
FIG. 3 is a schematic view of an illustrative control system for controlling the illustrative diesel engine system of FIG. 1 using the controller of FIG. 2.

FIG. 3 is a schematic view of an illustrative control system 94 for controlling the illustrative diesel engine system 10 of FIG. 1 using the ECU 88 of FIG. 2. As shown in FIG. 3, the ECU 88 can be configured to send various actuator input parameters 98 (i.e. "u(k)") related to the fuel and air-side control of the engine 20. As indicated generally by arrows 100 and 102, information from one or more air and fuel-side sensors (i.e. "y(k)") can then be fed to the state observer 90, which as described above with respect to FIG. 2, can be used by the ECU 88 for controlling the engine 20 and any associated engine components (e.g. turbocharger 34, compressor cooler 54, etc.). The actuator input signals 98 may represent, for example, the actuator set point signals (e.g. VNT SET 44, ETURBO SET 50, VGC SET 52, COMP. COOLER SET 56, EGR SET 60) of the engine 20 described above with respect to FIG. 1. The sensed output parameters 100,102, in turn, may include parameters or characteristics such as fuel delivery, exhaust gas recirculation (EGR), injection timing, needle lift, crankshaft angle, cylinder pressure, valve position and lift, manifold vacuum, fuel/air mixture, and/or air intake at the intake manifold.

The emissions processes associated with the engine 20 (represented generally by reference number 104) can be further used by the ECU 88 to compute and predict various actuator parameters for controlling $NO_x$, PM, or other emissions emitted from the engine 20 in addition to the air and fuel-side parameters 100,102. The exhaust emissions 104, for example, are well-known to be difficult to predict and may involve various unmeasured air and fuel composition parameters 106,108 indicating one or more constituents within the exhaust gas and/or fuel. The air composition signal 106 may represent, for example, a signal indicating the level of $NO_x$, PM, and/or other constituent within the exhaust gas, as measured by the post-combustion sensors

78,80,82. The fuel composition signal 108 may represent, for example, a signal detecting the biodiesel composition level in biodiesel/diesel fuel blends, as measured by the fuel composition sensor 86. It should be understood, however, that the air and fuel composition parameters 106,108 may comprise other parameters, if desired.

Based on the parameters 100,102 used by the engine 20 as well as the air and fuel composition parameters 106,108, a number of emissions-related parameters can be sensed and then fed as inputs to the state observer 90 in the ECU 88. The emissions processes 104 may sense, for example, the level of $NO_x$ in the exhaust stream and output a $NO_x$ sensor signal 110 that can be provided as a sensor input to the state observer 90. In similar fashion, the emissions processes 104 may sense PM in the exhaust stream and output a particulate matter (PM) signal 112 that can also be provided as a sensor input to the state observer 90. If desired, and in some embodiments, the emissions processes 104 of the engine 20 may be further instrumented with additional sensors and output other emissions-related signals 114 that can be provided as additional sensor inputs to the state observer 90, if desired. In some cases, the signals 110,112,114 may represent additional hardware utilized to measure emissions 104 such as additional sensors.

Once the state observer 90 determines an estimate of the internal state of the state space model $\hat{x}(k|k)$ reflecting the estimated state of the model, the state feedback controller 92 can then be configured to compute and predict future actuator moves for the actuators and/or states of the model of the engine 20. These computed and predicted actuator moves and/or states can then be used to control the engine 20, for example, so as to expel a reduced amount of emissions by adjusting fuel mixture, injection timing, percent EGR, valve control, and so forth. By incorporating emissions sensing that can be used by the state observer 90 to correct the internal state of the model based in part on the emissions processes 104 of the engine 20, the control system 94 may be better able to compensate for deteriorations in engine performance and/or aftertreatment device over the life of the engine 20.

Figure 4:
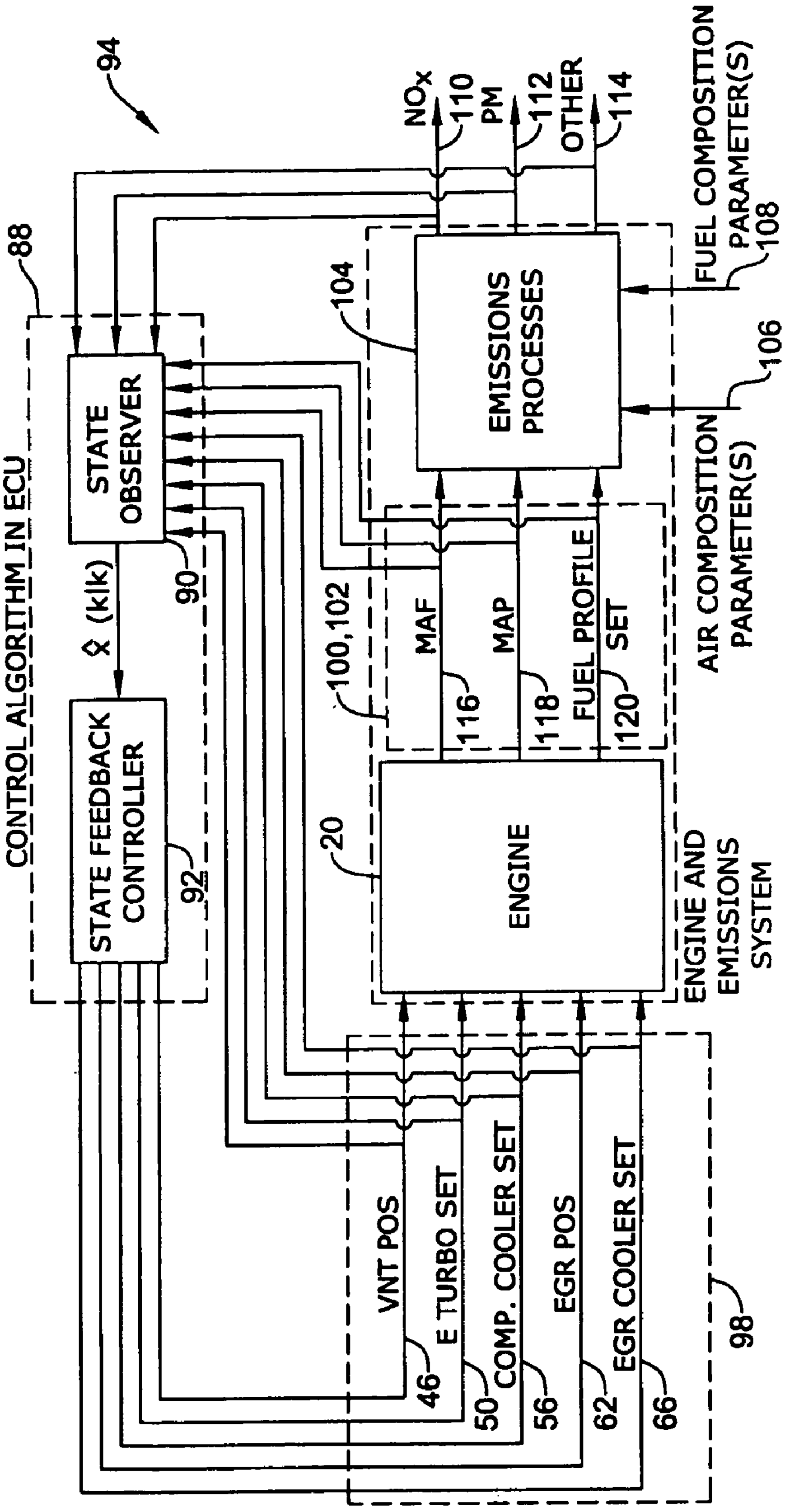
FIG. 4 is a schematic view of a particular implementation of the illustrative control system of FIG. 3.

An exemplary implementation of the control system 94 can be understood by reference to FIG. 4, which shows several illustrative input parameters and output parameters described above with respect to FIG. 1. As shown in FIG. 4, the engine 20 can be configured to receive a number of actuator input parameters 98 from the ECU 88 and/or from other system components, including the VNT POS signal 46 indicating the current vane position of the turbocharger, the ETURBO SET signal 50 for controlling the amount of electric motor assist, the COMP. COOLER SET signal 56 for controlling the temperature of compressed air provided by the compressor cooler 54, the EGR POS signal 62 indicating the current position of the EGR valve 58, and the EGR COOLER SET signal 66 for controlling the temperature of recirculated exhaust gas. Other actuator input parameters 98 in addition to or in lieu of these signals may be provided to the engine 20, however, depending on the particular application.

Based on the input parameters 46,50,56,62,66 received from the ECU 88, one or more air-side signals 100 can be sensed from the engine 20, including a manifold air flow (MAF) signal 116, a manifold air pressure (MAP) signal 118, and one or more fuel-side parameters 102 such as a fuel profile set signal 120. Information from pre-combustion sensors 116,118,120 along with information from post-combustion sensors 110,112,114 can then be fed to the state observer 90, which as described above, can be utilized by the ECU 88 to compute and predict various actuator parameters for controlling $NO_x$, PM, or other emissions emitted from the engine 20.

Figure 5:
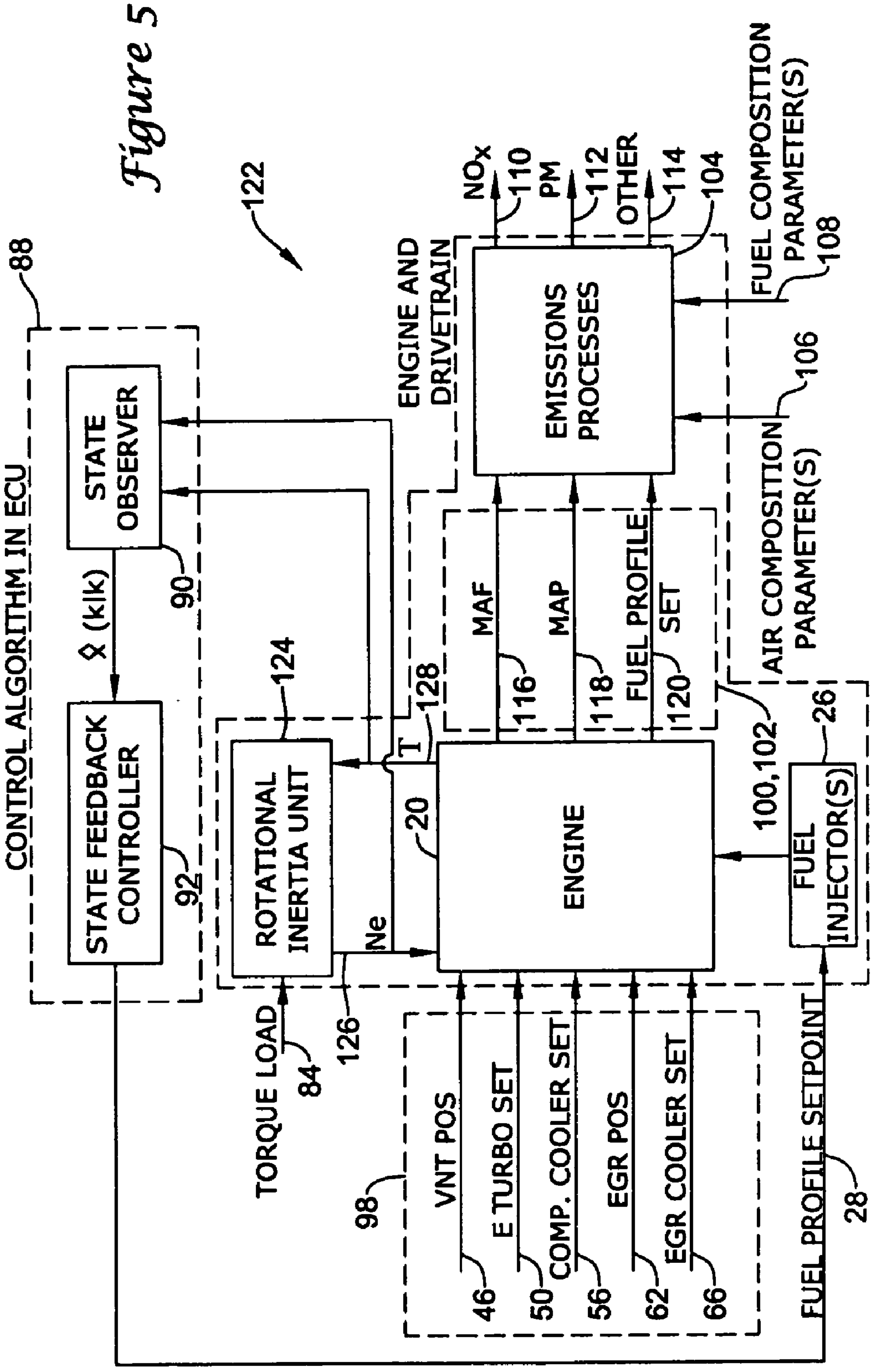
FIG. 5 is a schematic view of another illustrative control system for controlling the illustrative diesel engine system of FIG. 1.

FIG. 5 is a schematic view of another illustrative control system 122 for controlling the illustrative diesel engine system 10 of FIG. 1. The control system 122 of FIG. 5 is similar to that described above with respect to FIG. 4, with like elements labeled in like fashion in the drawings. In the illustrative embodiment of FIG. 5, however, the sensors may further include a torque sensor 84 which can be used along with the measured engine speed to estimate the internal state of a rotational inertia model 124 (e.g. an integrator) that can be used to compute and predict the rotational speed of the engine 20 based on signals received from the torque load sensor 84. As with other embodiments herein, the rotational inertia model 124 can be modeled with a state space model representation that uses signals sensed from the torque load sensor 84 to construct an online estimate of the internal state of the model 124. A trajectory of the rotational speed (Ne) computed and predicted by the rotational inertia model 124 can then be fed as one of the input parameters 98 to the state feedback controller 92.

As indicated further by arrow 128, the load or torque (T) on the engine 20 along with the engine speed 126 can then be sensed and fed to the state observer 90, which can be configured to compute an estimate of the internal state of the rotational inertia model 124 that can then be used to predict a new value of the rotational speed (Ne).

The ECU 88 can be configured to receive the rotational speed (Ne) and torque signals 126,128 as model inputs to the state observer 90, which, in turn, outputs a state vector $\hat{x}(k|k)$ that can be used by the state feedback controller 92 to adjust the fuel profile setpoint 28 used by the fuel injectors 26 to control the speed and load of the engine 20. If desired, the state feedback controller 92 may also output other parameters not explicitly shown that can be used to compensate one or more other parameters relating to the fuel-side control of the engine 20 and/or to the air-side control of the engine 20. In addition, other parameters such as that described above with respect to FIG. 4 may also be fed as model inputs to the state observer 90 for use in controlling other aspects of the engine 20 such as the emissions processes 104.

Figure 6:
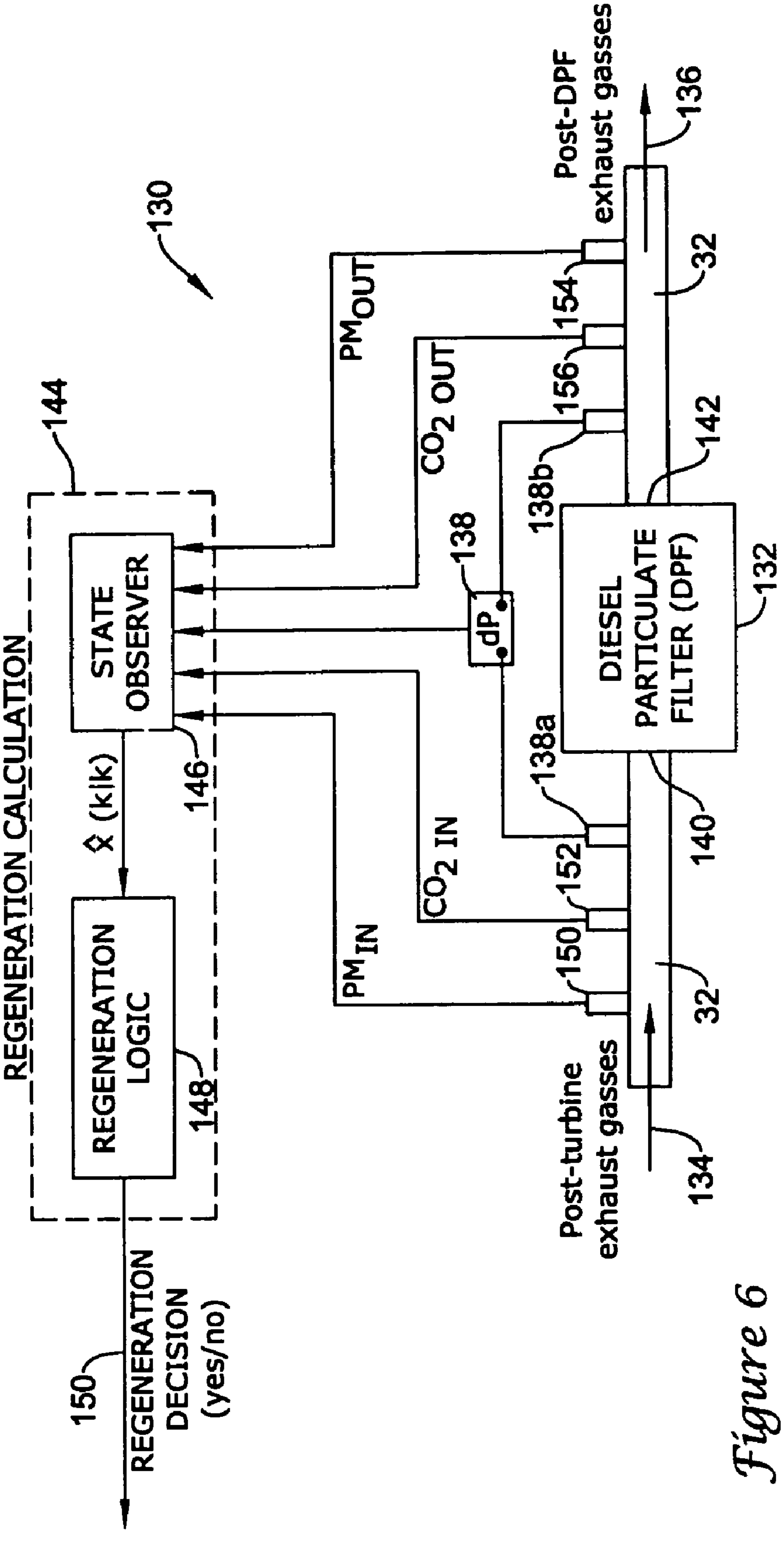
FIG. 6 is a schematic view of another illustrative control system for controlling an illustrative diesel engine aftertreatment system.

FIG. 6 is a schematic view of another illustrative control system 130 for controlling an illustrative diesel engine aftertreatment system. In the illustrative embodiment of FIG. 6, the aftertreatment system may include a Diesel Particulate Filter (DPF) 132 that can be used to filter post-turbine exhaust gasses 134 discharged from the exhaust pipe 32 of the turbine. The DPF 132 functions by collecting the engine-out particulate matter (PM) inside the filter 132 in order to reduce the number of particulates 136 discharged from the exhaust pipe 32 into the environment. Over time, however, the particulates trapped within the DPF 132 will tend to build-up inside, causing an increased backpressure against the engine that can reduce engine performance and fuel economy. In some embodiments, and as shown in the illustrative embodiment of FIG. 6, such backpressure can be measured using a differential pressure (dP) sensor 138, which may include two separate pressure sensors 138*a*, 138*b* for sensing the pressure drop across the input 140 and output 142 of the DPF 132. Once the DPF 132 reaches a sufficiently high internal PM load, it must be regenerated in order to relive the back pressure on the engine and for the DPF 132 to continue to output post-DPF exhaust gasses 136 having lower-levels of particulates. Typically, the regeneration is accomplished by igniting and burning-off the soot periodically within the DPF 132.

To determine whether to regenerate the DPF 132, an ECU 144 equipped with a state observer 146 and regeneration logic 148 can be tasked to perform regeneration calculations to determine whether regeneration is desired. The ECU 144 may comprise, for example, a Model Predictive Controller (MPC) or other suitable controller capable of providing predictive control signals to the DPF 132 subject to constraints in control variables and measured output variables. The regeneration decision 150 calculated and outputted by the regeneration logic 148 may represent a signal that can be used to trigger the injection of fuel into the DPF 132 to burn-off the undesired particulate matter. Other techniques may be used for regeneration, however, depending on the application.

The state observer 146 can be configured to receive a number of sensor signals representing various sensor measurements taken from the DPF 132 at time "k". In the illustrative embodiment of FIG. 6, for example, the state observer 146 can be configured to receive as model inputs sensor signals from an upstream particulate matter (PM) sensor 150 and/or a carbon dioxide ($CO_2$) sensor 152, which can be used to detect the level of PM and $CO_2$ contained in the post-turbine exhaust gasses 134. In similar fashion, the state observer 146 can be configured to receive as model inputs sensor signals from a downstream PM sensor 154 and/or $CO_2$ sensor 156, which can be used to detect the level of PM and $CO_2$ contained in the post-DPF exhaust gasses 136. In some cases, this may include the use of both upstream and downstream sensors 150,152,154, and 156 as the PM load in the DPF 132 is typically a function of the difference between the incoming and outgoing PM. In those embodiments including a differential pressure sensor 138, the state observer 146 can be further configured to receive sensor signals from each of the pressure sensors 138*a*,138*b*, allowing the ECU 144 to directly measure the pressure differential across the DPF 132.

Using the various sensor inputs, the state observer 146 can be configured to compute an estimate of the internal state $\hat{x}(k|k)$ of the DPF 132, which can then be provided to the regeneration logic 148 to determine whether to regenerate the DPF 132. Such regeneration can occur, for example, when the state observer predicts performance degradation of the DPF 132 based on the sensed signals from the PM and/or $CO_2$ sensors 150,152,154,156. Alternatively, or in addition, regeneration of the DPF 132 may occur when the state observer 146 estimates backpressure from the DPF 132 based on sensor signals received from the differential pressure sensor 138. The decision 150 on whether to regenerate the DPF 132 is thus based on the estimate $\hat{x}(k|k)$ of the internal state of the DPF 132 at time "k".

While the illustrative aftertreatment system 130 depicted in FIG. 6 uses a DPF 132 for the reduction of particulates within the exhaust pipe 32, it should be understood that other suitable aftertreatment devices may be used in addition to, or in lieu of, such device. Other aftertreatment systems and/or devices that could be implemented may include, for example, diesel oxidation catalysts (DOC), selective catalytic reduction (SCR), and lean $NO_x$ traps (LNT). Moreover, while two PM and $CO_2$ sensors are shown, other numbers and/or types of sensors may be used to sense particulates within the exhaust pipe 32. While it is anticipated that the decision to regenerate the aftertreatment device or devices is based at least in part on the internal state of the DPF 132, it should be understood that regeneration may also occur at certain scheduled times (e.g. once a day, every 500 miles of operation, etc.), or based on some other event.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A control system for controlling a diesel engine using feedback from one or more sensors, the diesel engine including at least one fuel injector, an intake manifold, and an exhaust manifold, the control system comprising:

one or more post-combustion sensors adapted to directly sense at least one constituent of exhaust gasses emitted from the exhaust manifold of the diesel engine;

a state observer adapted to estimate the internal state of a model relating to at least one parameter of engine performance using signals from said one or more post-combustion sensors; and a state feedback control algorithm adapted to set at least one actuator setpoint based on the estimated state outputted by the state observer for controlling one or more actuators of the diesel engine.

2. The control system of claim 1, wherein said one or more post-combustion sensors includes an oxides of nitrogen ($NO_x$) sensor.

3. The control system of claim 1, wherein said one or more post-combustion sensors includes a particulate matter (PM) sensor.

4. The control system of claim 1, further comprising an in-cylinder pressure (ICP) sensor adapted to directly sense internal cylinder pressure within said diesel engine.

5. The control system of claim 1, further comprising one or more fuel composition sensors for measuring at least one constituent of fuel provided to the diesel engine by said at least one fuel injector.

6. The control system of claim 1, where the state observer uses an online state space model adapted to monitor and adjust an internal predictive state based on feedback signals from the one or more post-combustion sensors.

7. The control system of claim 1, further comprising a torque load sensor for measuring torque demand on said diesel engine.

8. The control system of claim 7, further comprising a rotational inertial unit adapted to compute and predict engine speed based on signals received from said torque load sensor.

9. The control system of claim 1, where the state observer includes an algorithm adapted to run on an electronic control unit.

10. The control system of claim 1, wherein the control system is adapted to control an aftertreatment system.

11. A method for controlling a diesel engine using feedback from one or more sensors, the diesel engine including at least one fuel injector, an intake manifold, and an exhaust manifold, the method comprising the steps of:

directly measuring at least one constituent in the exhaust stream of the engine using one or more post-combustion sensors;

providing a state observer including a state space model representation of the diesel engine;

determining the internal state of the state space model based in part on feedback signals received from the one or more post-combustion sensors;

updating the internal state of the model in the event the true state of the model differs from an estimated state thereof;

computing one or more actuator setpoints as a function of the estimated state from the state observer; and adjusting one or more actuator setpoints based on the computed state estimate.

12. The method of claim 11, further comprising the steps of:

directly measuring the torque load on the diesel engine using a torque load sensor operatively coupled to the engine;

determining the internal state of the state space model based on feedback signals received from the torque load sensor; and further updating the internal state of the model in the event the true state of the model differs from an estimated state thereof.

13. The method of claim 11, further comprising the steps of:

directly measuring the in-cylinder pressure of the diesel engine using an in-cylinder pressure (ICP) sensor operatively coupled to the engine;

determining the internal state of the state space model based on feedback signals received from the in-cylinder pressure sensor; and further updating the internal state of the model in the event the true state of the model differs from an estimated state thereof.

14. The method of claim 11, further comprising the steps of:

directly measuring at least one constituent of fuel provided to the diesel engine using a fuel composition sensor;

determining the internal state of the state space model based on feedback signals received from the fuel composition sensor; and further updating the internal state of the model in the event the true state of the model differs from an estimated state thereof.

* * * * *